United States Patent [19]
Gold et al.

[11] Patent Number: 5,926,840
[45] Date of Patent: Jul. 20, 1999

[54] OUT-OF-ORDER FETCHING

[75] Inventors: Anthony P. Gold, Wayne; Richard Schranz, Norristown, both of Pa.

[73] Assignee: Unisys Corporation, Blue Bell, Pa.

[21] Appl. No.: 08/768,945

[22] Filed: Dec. 18, 1996

[51] Int. Cl.⁶ .................................................. G06F 13/16
[52] U.S. Cl. ........................................ 711/169; 711/156
[58] Field of Search ............................. 711/145, 167, 711/168, 169, 154, 156

[56] References Cited

U.S. PATENT DOCUMENTS

| | | | |
|---|---|---|---|
| 4,945,512 | 7/1990 | DeKarske | 365/49 |
| 5,450,564 | 9/1995 | Hassler | 711/158 |
| 5,530,823 | 6/1996 | Tsuchiya | 711/207 |
| 5,530,933 | 6/1996 | Frink | 711/141 |
| 5,659,707 | 8/1997 | Wang | 711/145 |
| 5,671,444 | 9/1997 | Akkary | 395/872 |
| 5,737,753 | 4/1998 | Tsuchiya | 711/136 |

*Primary Examiner*—Tod R. Swann
*Assistant Examiner*—Christopher S. Chow
*Attorney, Agent, or Firm*—John B. Sowell; Mark T. Starr; Steven B. Samuels

[57] ABSTRACT

A system and method is provided for assigning job numbers to fetch requests that are sent to a memory system in order and completed by the memory system out-of-order. A unique set of job numbers represent addresses in a memory fetch list. A valid register maintains status bits associated with the set of job numbers that identify whether a job number is assigned or available. Bits in the valid register are set when an associated job number is assigned and reset when an associated job number is completed. On assignment, a priority encoder selects any lowest available job number based upon the status of the bits in the valid register. In the preferred embodiment, the lowest available job number is selected.

6 Claims, 3 Drawing Sheets

OUT-OF-ORDER FETCHING

BACKGROUND OF THE INVENTION

1. Field of the Invention

The present invention relates generally to data cache systems, and more specifically is directed toward a system and method for processing fetch requests that are completed out-of-order.

2. Related Art

Conventional computing systems typically include a memory hierarchy having multiple cache levels. Upper level caches are typically smaller and faster than lower level caches. The size and speed of the upper-level cache allows it to match the clock cycle time of the central processing unit (CPU). Success or failure of an access into the upper-level cache is designated as a hit or a miss, respectively. Simply stated, a hit is a memory access found in the upper level, while a miss means that the memory access is not found in the upper level. Associated with a miss is a miss penalty which is the time to deliver the block to the requesting device (normally the CPU).

One method of reducing the miss penalty is to provide a second level of cache between the upper level cache and main memory. This second-level cache is designed to capture many accesses that would otherwise go to the main memory. In a similar manner to the upper-level cache, the second-level cache also incurs hits, misses and the associated miss penalty. The miss penalty includes the time it takes to retrieve a block from the main memory.

The transfer of data from the main memory to the second-level cache is controlled by a memory controller that is associated with the second-level cache. This memory controller issues fetch requests to the main memory. Assigned to each fetch request is a job number that associates returned data from memory with a previously issued fetch request. A limited number of job numbers (e.g., 8) are typically available for assignment to received fetch requests.

In conventional systems, fetch requests are issued in order based upon the order that they are received. This in-order processing of the fetch requests by the memory controller ensures that the sequence of reads and writes to memory are performed in the order defined by the CPU. In operation, the job numbers previously assigned to fetch requests that have been completed are reassigned to new fetch requests that are received by the CPU. Reassignment of the job numbers is typically performed sequentially (e.g., . . . , 5, 6, 7, 0, 1, 2, . . . ).

A problem with this sequential reassignment occurs when the next job number in the sequence has not yet completed. For example, consider the case where job number 7 has just been assigned, and job numbers 0–6 remain outstanding. The next job number to be assigned is job number 0. Until job number 0 completes, a job number cannot be reassigned to the next fetch request that is received by the memory controller. The memory controller continues to delay reassignment even if another fetch request (e.g., fetch request that is associated with job number 1) has completed. This out-of-order completion scenario can significantly affect the cache miss penalty. Therefore, what is needed is a system and method for maximizing job number reuse to prevent unnecessary delays in the issuance of additional fetch requests.

SUMMARY OF THE INVENTION

The present invention satisfies the above mentioned needs by providing a fetch queuing interface mechanism that maximizes the use of job numbers assigned to fetch requests that complete out-of-order. The fetch queuing interface mechanism includes a memory fetch list that stores fetch request data that is to be sent to memory. Fetch request data is stored in the memory fetch list based upon an assigned job number. When a job number is assigned to a fetch request, a bit in a valid register corresponding to that job number is set.

The assigned job numbers for fetch requests that are to be sent to memory are stored in the order of their receipt. The job numbers are provided to the memory fetch list as read pointers. Fetch request data at the read pointer location are then sent to the memory.

After the memory completes the fetch request, the memory returns the job number. The bit in the valid register that corresponds to the returned job number is reset, thereby indicating that the memory fetch list has an opening at the job number location. The job number can then be reassigned.

In a preferred embodiment of the present invention, the assignment process is based upon a priority encoder's analysis of the state bits in the valid register. Specifically, the priority encoder identifies the lowest available job number. This lowest available job number is assigned to a next received fetch request. In this manner, job numbers that are completed out-of-order can be immediately reassigned by the fetch queuing interface mechanism.

The foregoing and other features and advantages of the invention will be apparent from the following, more particular description of a preferred embodiment of the invention, as illustrated in the accompanying drawings.

BRIEF DESCRIPTION OF THE FIGURES

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Figure 1:
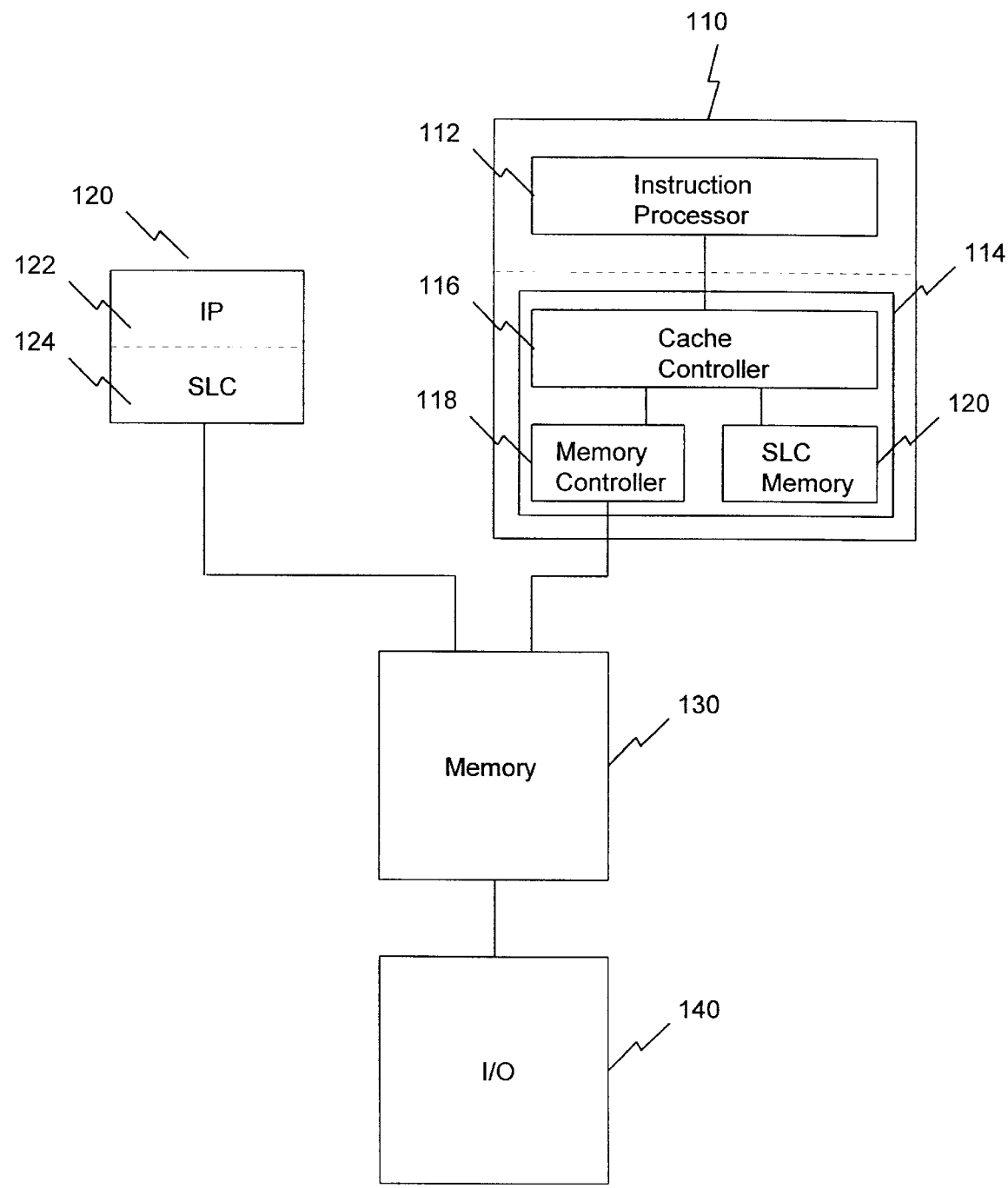
FIG. 1 illustrates a block diagram of a processing system that includes a second-level cache.

In a general computer system configuration, a central processing unit (CPU) and one or more input/output (I/O) devices interface with a main memory. This configuration is illustrated in FIG. 1. The general class of I/O devices 140 include printers, tape drives, hard disks, or the like. Each of these I/O devices 140 interface with memory 130. Memory 130 can have a capacity in the gigabyte range. As further illustrated in FIG. 1, one or more CPUs 110, 120 also interface with memory 130. In a preferred embodiment, CPUs 110 and 120 include instruction processors 112 and 122 and second-level caches (SLC) 114 and 124, respectively.

FIG. 1 further illustrates a more detailed block diagram of second-level cache 114. Second-level cache 114 includes cache controller 116, memory controller 118, and second-level cache memory 117. As noted above, a second-level cache is designed to capture misses in a first-level cache (not shown) that would ordinarily go to memory 130. If there is a miss in second-level cache memory 117, then a fetch request is sent to memory 130. Memory controller 118 provides an interface between second-level cache 114 and memory 130.

Figure 2:
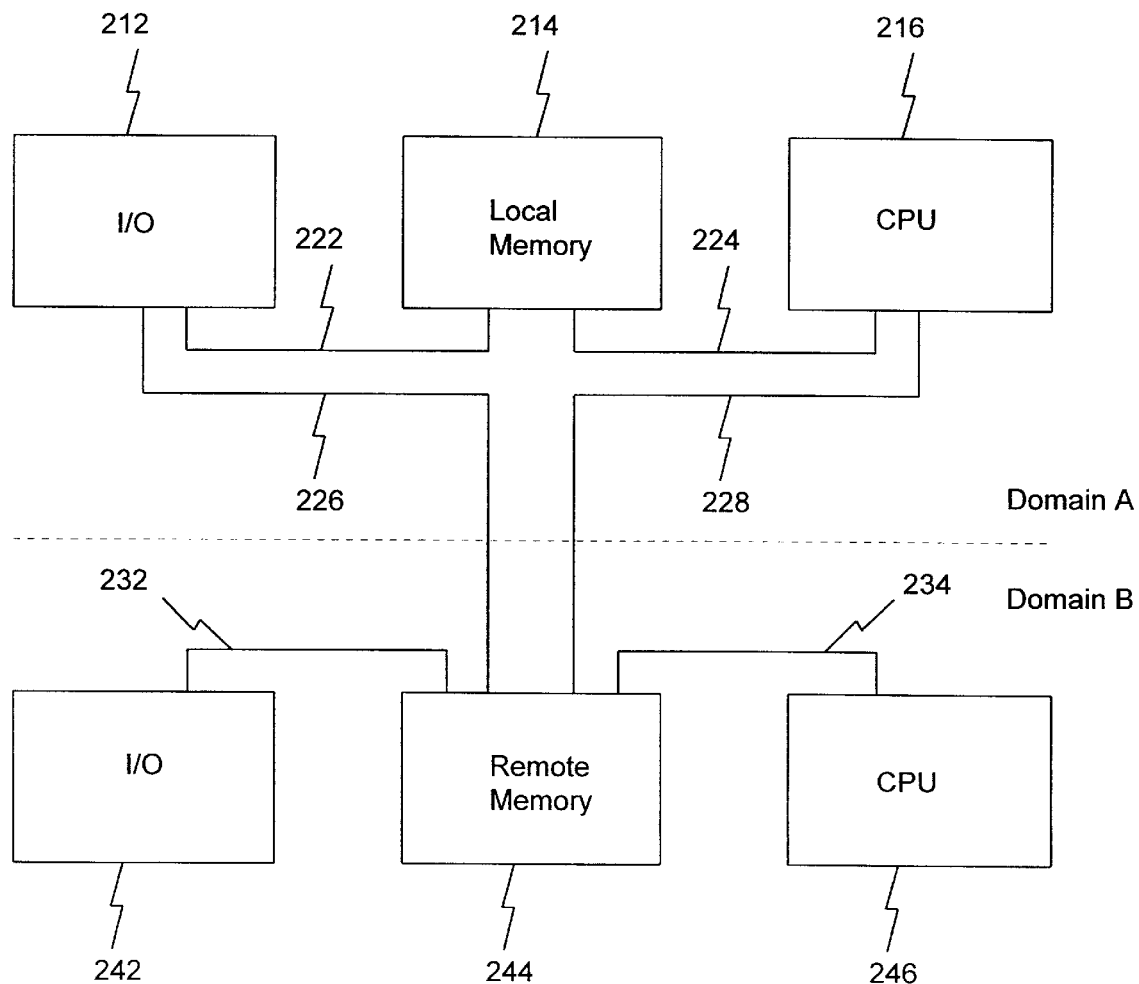
FIG. 2 illustrates an interaction between memory systems in different domains.

Prior to describing memory controller 118 in detail, it should be noted that in alternative embodiments each CPU 110, 120 has additional memory controllers that interface with additional memory systems. FIG. 2 illustrates an exemplary configuration. This configuration includes two I/O device sets 212, 242, two memory systems 214, 244, and two CPUs 216, 246. I/O device set 212, memory 214, and CPU 216 are associated with Domain A while I/O device set 242, memory 244, and CPU 246 are associated with Domain B. Domains A and B can represent parts of a computer system that are powered separately.

In operation, I/O device set 212 and CPU 216 interface with memory 214 via memory controllers 202a and 118a, respectively. The signal paths for this interface are represented by signal lines 222 and 224, respectively. From the perspective of I/O device set 212 and CPU 216, memory 214 is considered a local memory. This standard configuration was described above with reference to FIG. 1. In addition to accessing local memory 214, I/O device set 212 and CPU 216 can also interface with memory 244 in Domain B via memory controllers 202b and 118b, respectively. The signals paths for this interface are represented by signal lines 226 and 228, respectively. From the perspective of I/O device set 212 and CPU 216, memory 244 is considered a remote memory.

In a similar manner, I/O device set 242 and CPU 246 in Domain B can interface with both memory 214 and 244. Specifically, I/O device set 242 and CPU 246 interface with memory 244 via memory controllers 202c and 118c, respectively. The signal paths for this interface are represented by signal lines 232 and 234, respectively. From the perspective of I/O device set 242 and CPU 246, memory 244 is considered a local memory. In addition to accessing local memory 244, I/O device set 242 and CPU 246 can also interface with memory 214 in Domain A via memory controllers 202d and 118d, respectively. The signal paths for this interface are represented by signal lines 236 and 238, respectively. From the perspective of I/O device set 242 and CPU 246, memory 214 is considered a remote memory.

Figure 3:
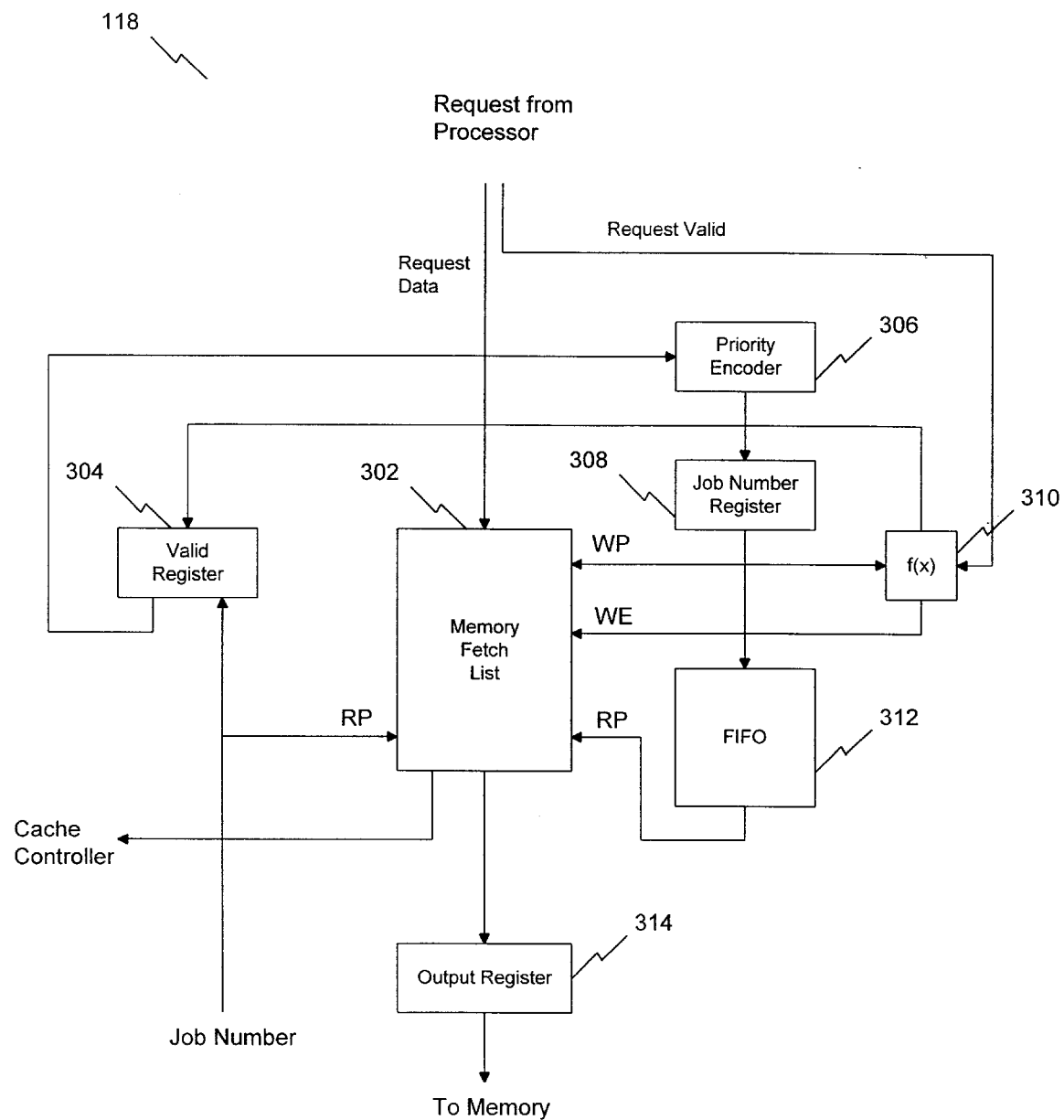
FIG. 3 illustrates a fetch queuing interface mechanism according to the present invention.

FIG. 3 illustrates a more detailed view of the contents of memory controller 118. As will be explained below, memory controller 118 includes logic that maximizes the reuse of job numbers associated with fetch requests that are sent to memory system 130. Memory system 130 can complete fetch requests out-of-order. The processing of fetch requests by memory controller 118 is first described. Fetch requests are received by memory controller 118 from the first-level cache (not shown) in instruction processor 112 via second level cache controller 116.

As illustrated in FIG. 3, the data in the fetch request is sent to memory fetch list 302 while a request valid signal is sent to logic 310. The request valid signal indicates that valid fetch request data is available to be written into memory fetch list 302. In a preferred embodiment, memory fetch list 302 is a 4-port Growable Register Array (GRA) implemented as embedded RAM. Memory fetch list 302 can store eight fetch request entries that are 56 bits in length. Fetch request data includes code request information, address information, etc. In the preferred embodiment, eight fetch requests can remain outstanding. In other words, if memory controller 118 has issued eight fetch requests to memory 130, memory controller 118 cannot issue an additional fetch request until memory 130 has completed at least one fetch request (i.e., returned the requested data to cache controller 116).

As noted above, logic 310 receives a request valid signal from instruction processor 112. Logic 310 controls the writing of the fetch request data into memory fetch list 302. Writing fetch request data into memory fetch list 302 requires a write pointer and a write enable signal. The write pointer is based upon the assignment of job numbers. Eight job numbers (0–7) are available. These eight job numbers correspond to the eight entries in memory fetch list 302. The eight job numbers are 3-bit tags that represent addresses in memory fetch list 302. Thus, the assigned job number (i.e., 3-bit tag) is used as a write pointer for storage of the fetch request data in one of the eight entries. Specifically, priority encoder 306 assigns the next job number to incoming fetch requests. These assigned job numbers are provided as a write pointer to memory fetch list 302 via job number register 308. The assignment logic of priority encoder 306 is described below with respect to the processing of out-of-order fetches.

As illustrated in FIG. 3, the assigned job number is provided along with the request valid signal to logic 310. Logic 310 generates a write enable signal that is provided to memory fetch list 302 for writing of the fetch request data at the location indicated by the write pointer. Logic 310 also sends the assigned 3-bit job number to valid register 304. Briefly, valid register 304 uses the assigned 3-bit job number to update status information on the availability of storage locations and their associated job numbers.

The assigned job number is also provided to first-in-first-out (FIFO) memory 312. FIFO 312 stores the job numbers in the order that they were assigned to fetch requests received from instruction processor 112. FIFO 312 outputs the assigned job numbers as a read pointer to memory fetch list 302. As noted above, the job number is an address into memory fetch list 302. Based upon these addresses, memory fetch list 302 outputs fetch request data to memory 130 via output register 314. Clearly, since the job numbers are provided to FIFO 312 in the order that they were assigned, the fetch requests are sent to memory 130 in the order that they were received from instruction processor 112.

Memory 130 can complete these fetch requests out-of-order. In other words, memory 130 can return the requested data out-of-order with respect to the order in which the fetch requests were received. Out-of-order completion can result due to a variety of reasons. For example, the processing of a fetch request could be delayed if memory 130 must retrieve the requested data from a second-level cache in a second CPU. This scenario is illustrated with reference to FIG. 1. If data needed by instruction processor 112 does not reside in second-level cache memory 117, memory controller 118 sends a fetch request to memory 130. The requested data most likely resides in memory 130 and can be immediately returned. However, if the requested data resides in second-level cache 124 in CPU 120, delays in processing the fetch request can occur. This delay could cause memory 130 to return data to memory controller 118 out-of-order.

Upon completion of a fetch request, memory 130 returns (1) the requested data to cache controller 116 directly, and (2) the job number to memory controller 118. The returned job number is used to match the returned data to a previously transmitted fetch request. FIG. 3 illustrates the receipt of the job number from memory 130. The returned job number is sent to both valid register 304 and memory fetch list 302. With respect to fetch list 302, the job number is provided as a read pointer. This read pointer causes memory fetch list 302 to output the fetch request data for that job number to cache controller 116. This fetch request data is matched with the requested data that is returned to cache controller 116 from memory 130.

The impact of the received job number on valid register 304 is now described. Valid register 304 contains 8 location bits. Each bit corresponds to one of the eight locations in memory fetch list 302. When a valid bit is set, memory controller 118 knows that a corresponding location in memory fetch list 302 is being used. Further, since each memory location in memory fetch list 302 corresponds to a single job number, memory controller 118 knows that the corresponding job number has been assigned. If the job number has been assigned it is not available. Conversely, if any bit in valid register 304 is not set, memory controller 118 knows that the corresponding job number is available.

In operation, valid register 304 continually sets and resets individual bits. As noted above, valid register 304 receives a job number from logic 310. This job number is assigned to a fetch request that has been received from instruction processor 112. When the fetch request data is written into memory fetch list 302 based upon the write enable signal, the assigned job number is sent to valid register 304. Valid register 304 uses the assigned job number to set a corresponding bit. For example, if fetch request data has been written into location 5 in memory fetch list 302, job number 5 (i.e., tag 101) is sent to valid register 304. Valid register 304 then sets the bit in location five thereby indicating that job number 5 has been assigned.

After a fetch request is completed by memory 130, a job number is returned to valid register 304. The completion of the fetch request means that the job number location in memory fetch list 302 is available for storing newly received fetch request data. This completion also signals that the job number is available for reassignment. Accordingly, valid register 304 resets a bit in the location corresponding to the returned job number.

Based upon the status of the eight bits in valid register 304, priority encoder 306 selects the next job number to be reassigned to the next fetch request. In a preferred embodiment, priority encoder 306 selects the lowest available job number. Thus, if job numbers 0, 2, 5 and 7 are available, priority encoder 306 selects job number 0. The value of the last assigned job number does not influence the assignment of the next job number. The following example illustrates the operation of the elements in memory controller 118.

In this example, assume that five fetch requests have been received from instruction processor 112. Assume further that as these five fetch requests are sent to memory 130 in-order based upon the control of FIFO 312, no fetched data has been returned from memory 130. These five fetch requests are outstanding and are assigned job numbers 0–4. Based upon their assignment by priority encoder 306, valid register 304 has status bits [1, 1, 1, 1, 1, 0, 0, 0] in the eight bit locations.

If, prior to receipt of a sixth fetch request, memory 130 completes job numbers 1 and 3, the valid register is updated to have status bits [1, 0, 1, 0, 1, 0, 0, 0]. At this point, job numbers 1 and 3 are added back to the pool of job numbers (5, 6 and 7) that are available for assignment to new fetch requests. Upon the receipt of the sixth fetch request, priority encoder 306 does not select the next available job number in the sequence relative to the last assignment (i.e., job number 5). Instead, priority encoder 306 selects the lowest available job number from the pool of available job numbers (i.e., job number 1). Job number 1 is then assigned to the sixth fetch request. Further, bit position 2 of valid register 304 is set for job 1. Valid register 304 now has status bits [1, 1, 1, 0, 1, 0, 0, 0].

In this reassignment process, the write pointer to memory fetch list 302 does not cycle through the addresses represented by the job numbers. This cycling would occur if the job numbers were assigned in-order to the newly received fetch requests. Rather, the write pointer will move sporadically within the set of job numbers. The value of the write pointer may not be uniformly distributed among the eight job numbers. For example, if memory controller 118 has, over a period of time, no more than five fetch requests outstanding, then the write pointer will be concentrated on job numbers 0–4 using valid bits 1–5.

A benefit of the memory controller defined by FIG. 3 is the monitoring capabilities provided by the write pointer. The write pointer position can provide an indication of the fullness of memory fetch list 302. If memory fetch list 302 is often full, then job number 7 is being assigned frequently. Memory 130 would then appear to be the bottleneck in the memory fetch process. Conversely, if memory fetch list 302 is normally half full, then memory 130 is processing fetch requests near the rate that the fetch requests are received from memory controller 116.

While the invention has been particularly shown and described with reference to preferred embodiments thereof, it will be understood by those skilled in the relevant art that various changes in form and details may be made therein without departing from the spirit and scope of the invention.

What is claimed is:

1. A memory controller for queuing fetch request, comprising:

list means for storing said fetch requests to be sent to a main memory;

means for appending an assigned job number to each fetch request in said list means;

said means for appending job numbers including means for storing information representing all job number locations in said list means;

means coupled to said information storing means for determining the lowest available job number to be appended to a fetch request in said list means;

write pointer means coupled to said list means for storing a job number with said fetch requests in the order of their receipt;

means for receiving data from said main memory and the job number associated with completed requests from memory; and encoder means coupled to the receiving means for resetting the state of said information storing means to represent the availability of job number locations in said list means.

2. The system of claim 1, wherein said encodes means further comprising means for setting the state of said information storing means to represent the assignment of job number locations in said list means.

3. A method in a memory controller for assigning job numbers to fetch requests that are processed by a memory system out-of-order, comprising the steps of:

(1) storing fetch request data in a memory fetch list at a location indicated by an associated job number;

(2) sending, by the memory controller, said fetch request data to the memory system;

(3) receiving at said memory controller, the requested data with a job number from the memory system when an outstanding fetch request has been completed;

(4) resetting a bit in a valid register that corresponds to said received job number; and (5) selecting, by the memory controller, based upon a status of bits in said valid register, a lowest available job number; and
(6) assigning, by the memory controller, said lowest available job number to a next fetch request that is stored in said memory fetch list.

4. The method of claim 3, further comprising the step of:
setting a bit in said valid register when a job number is returned to said memory controller in response to a fetch request.

5. The method of claim 3, further comprising the step of:
(7) storing job numbers assigned to newly received fetch requests in a first-in-first-out memory stack in the order that said fetch requests were received.

6. The method of claim 5, further comprising the step of:
using said job number from said first-in-first-out memory stack as a read pointer to said memory fetch list to read out of order a fetch request to the memory system.

* * * * *